(12) United States Patent
Vignau-Lous et al.

(10) Patent No.: US 8,817,477 B2
(45) Date of Patent: Aug. 26, 2014

(54) AUDIO/VIDEO APPLIANCE OF IMPROVED ERGONOMICS AND EXTRACTABILITY FOR INCORPORATING IN A MOTOR VEHICLE, IN PARTICULAR A CAR RADIO

(75) Inventors: Bertrand Vignau-Lous, Paris (FR); Hocine Belkhoudja, Paris (FR)

(73) Assignee: Parrot, Paris (FR)

( * ) Notice: Subject to any disclaimer, the term of this patent is extended or adjusted under 35 U.S.C. 154(b) by 986 days.

(21) Appl. No.: 12/887,133

(22) Filed: Sep. 21, 2010

(65) Prior Publication Data

US 2011/0129100 A1 Jun. 2, 2011

(30) Foreign Application Priority Data

Dec. 2, 2009 (FR) ...................... 09 58577

(51) Int. Cl.
*H05K 5/00* (2006.01)
*B60R 11/02* (2006.01)
*G06F 1/16* (2006.01)
*H05K 7/00* (2006.01)
*H05K 7/16* (2006.01)
*H01H 9/02* (2006.01)
*H01H 13/04* (2006.01)
*H01H 23/04* (2006.01)
*H01R 13/46* (2006.01)
*B60R 11/00* (2006.01)

(52) U.S. Cl.
CPC ......... *B60R 11/02* (2013.01); *B60R 2011/0047* (2013.01)
USPC ................. 361/732; 361/679.02; 361/679.43; 361/679.57; 361/725; 361/727; 174/55

(58) Field of Classification Search
USPC ............. 361/679.01, 679.02, 679.35, 679.37, 361/679.38, 679.39, 679.43, 679.57, 361/679.58, 724, 725, 726, 727, 730, 731, 361/732, 752, 754, 756, 796, 800, 814; 174/55, 56, 57, 559, 61, 62, 63; 312/7.1, 9.11, 9.14; 439/297, 298, 299, 439/304, 142; 248/27.3; 455/345, 346, 347, 455/348, 349
See application file for complete search history.

(56) References Cited

U.S. PATENT DOCUMENTS

| | | | |
|---|---|---|---|
| 4,679,026 A | 7/1987 | Knakowski et al. | |
| 4,881,295 A | 11/1989 | Odemer | |
| 5,381,684 A | 1/1995 | Kawamura | |
| 5,779,197 A * | 7/1998 | Kim .............................. | 248/27.1 |

FOREIGN PATENT DOCUMENTS

DE 3415846 A1 4/1984

* cited by examiner

*Primary Examiner* — Hoa C Nguyen
*Assistant Examiner* — Binh Tran
(74) *Attorney, Agent, or Firm* — Haverstock & Owens LLP

(57) ABSTRACT

The assembly comprises: a car radio with a housing and a removable half front plate; a mounting sheath; means for securing the housing in the sheath; and means for unlocking the housing, said means comprising a tool suitable for being inserted in at least two orifices formed in the front face of the housing. These two orifices are formed in a central zone of the housing that is hidden by the front plate when it is mounted on the housing, and that is visible when the front plate is separated from the housing. The assembly has essentially no peripheral cover fitted thereto. The U-shaped tool makes it easy to extract the car radio using one hand in a single movement.

6 Claims, 2 Drawing Sheets

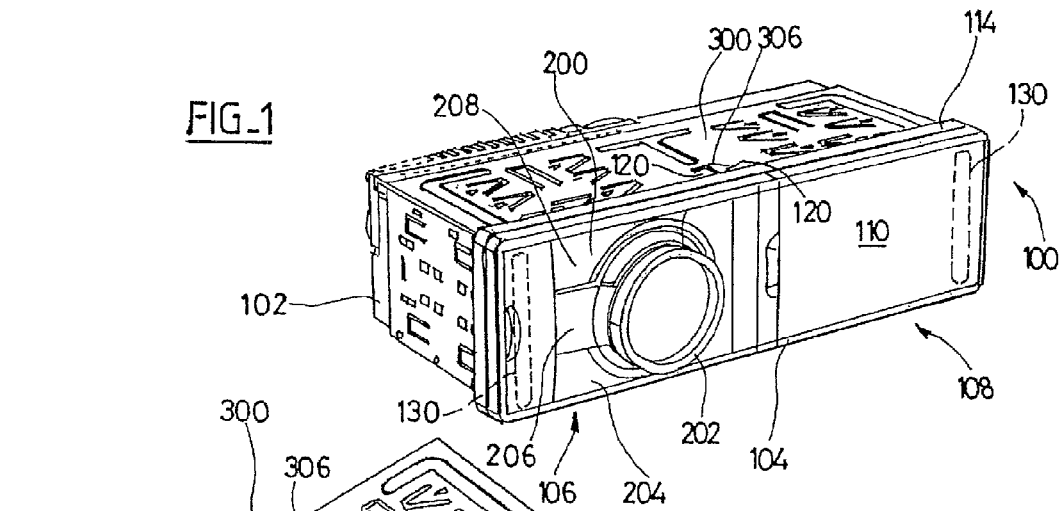
FIG_1
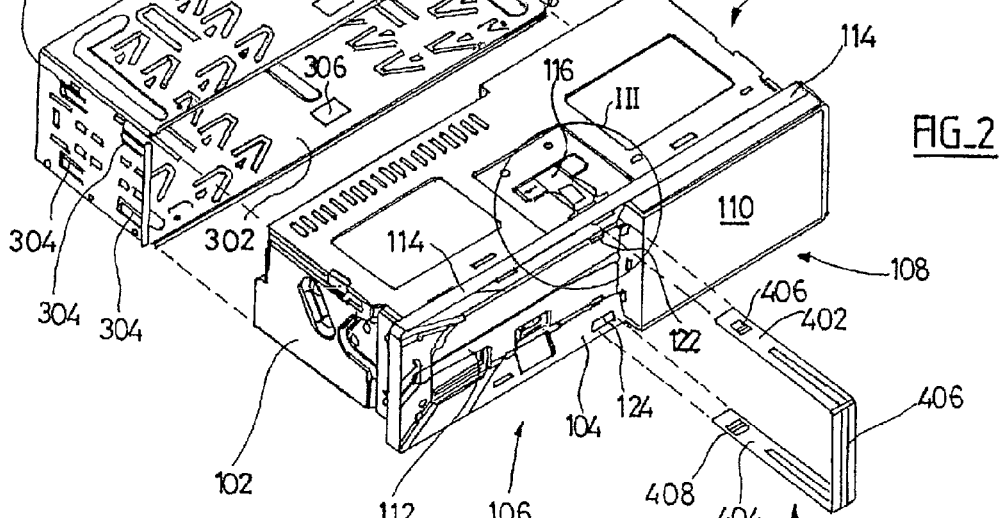
FIG_2
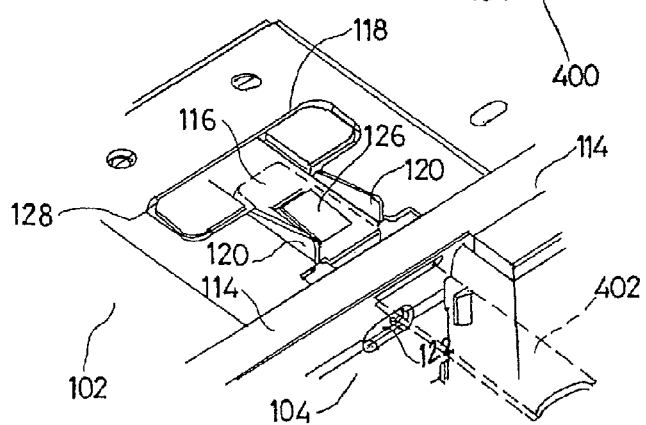
FIG_3

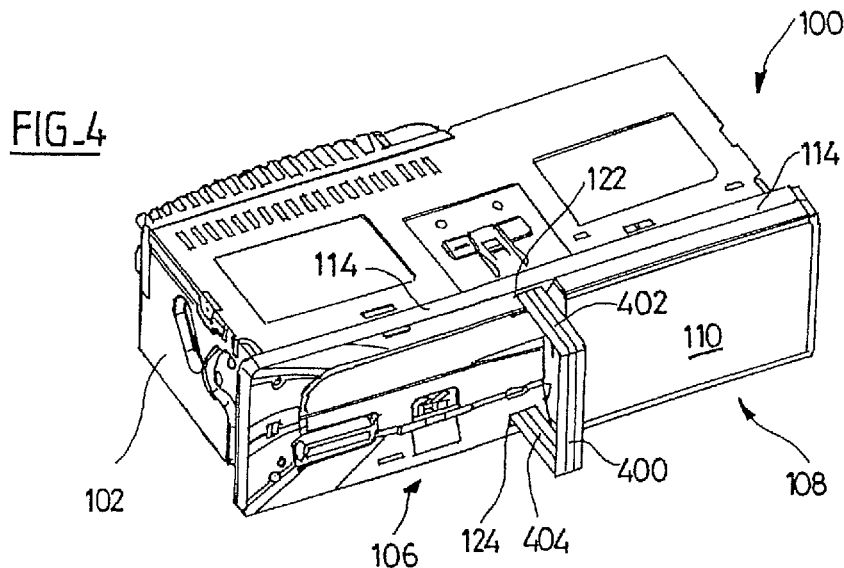
FIG_4
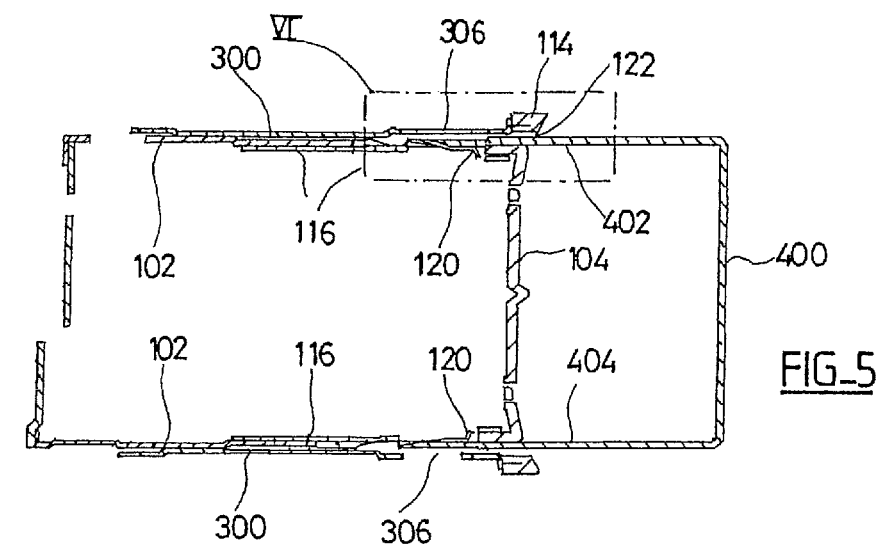
FIG_5
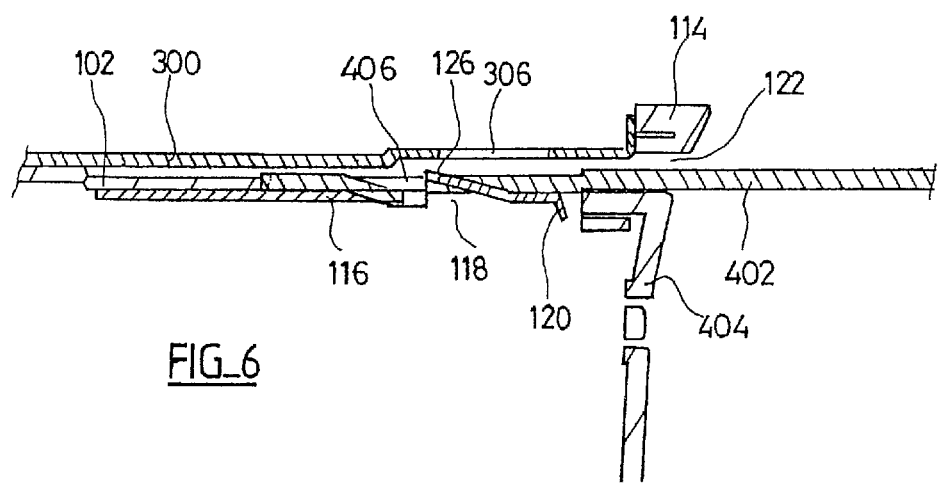
FIG_6

AUDIO/VIDEO APPLIANCE OF IMPROVED ERGONOMICS AND EXTRACTABILITY FOR INCORPORATING IN A MOTOR VEHICLE, IN PARTICULAR A CAR RADIO

FIELD OF THE INVENTION

The invention relates to mounting audio/video electronic appliances such as car radios on board motor vehicles.

It should be observed that although the described application of the invention to car radios is particularly advantageous, the invention is not limited to that application, and it will readily be understood that it may be applied to a wide variety of other types of electronic appliance.

BACKGROUND OF THE INVENTION

Such appliances are generally mounted in a slot of standardized dimensions referred as "1 DIN" (from the DIN 75490/ISO 7736 standard), corresponding to an opening having dimensions of 180 millimeters (mm)×50 mm.

To mount the car radio, the technique consists in placing a generally metal mounting sheath that is snap-fastened, or fastened in any other appropriate way, inside the opening provided for this purpose in the dashboard (or the central console or any other suitable location). The metal sheath is generally left permanently in the opening and serves as an internal support and guide for inserting the car radio in the dashboard.

Once the sheath has been installed, the car radio is inserted and snap-fastened therein. Snap-fastening is performed by means of anti-return spring tongues such that once the car radio housing has been put into place it cannot be withdrawn from its position without using a suitable dismounting tool.

The dismounting tool is generally constituted by U-shaped keys having two branches in the form of needles that are inserted into orifices provided in the front face of the car radio housing in order to separate the car radio housing from the metal sheath: on being inserted, the needles press against the spring tongues, thereby pushing them back and releasing the housing so that it can be extracted freely from the sheath.

That mounting system requires orifices to be provided for inserting the dismounting tool, which orifices are usually two or four in number and disposed symmetrically at each side edge of the front face of the car radio housing.

By way of example, that mounting system is illustrated by U.S. Pat. No. 4,679,026 A (Blaupunkt-Werke GmbH), which describes a car radio having a flexible tongue fastener system on each of its left and right sides with two pairs of lateral orifices in its front face enabling a U-shaped key to be inserted to push back the tongues and separate the housing from the sheath.

The presence of these orifices is necessary in order to enable the car radio to be dismounted and extracted from the metal sheath in which it is fastened.

Orifices in the front face are very common in older models or in models forming part of the original equipment of a vehicle, but they are nevertheless relatively unattractive.

In other appliances, a plastics cover piece is provided that is fitted after mounting and snap-fastened to the sheath so as to overlie the peripheral edge of the car radio and hide these orifices. Nevertheless, that solution presents the two drawbacks of requiring an additional part and of being relatively unattractive insofar as it leaves visible an additional, relatively wide, and non-functional frame.

Finally, ergonomically speaking, the presence of orifices inevitably implies that a non-negligible area is occupied on either side of the front face of the housing, which area cannot be used for other purposes.

In particular, if it is desired to install a relatively large display on the car radio going all the way to the extreme edges of the housing, offsetting the display sideways prevents orifices from being incorporated in the housing for dismounting purposes. If a plastics cover hides such orifices, the presence of such a part likewise prevents a display being provided that extends to the edges of the car radio.

One possible solution consists in providing a dismountable front plate that is removably mounted on the housing.

An example of a car radio having a removable front plate is described for example in FR 2 920 945 A1 (Parrot S.A.). That removable front plate carries various control buttons for the car radio and acts as an anti-theft element; it may also serve to uncover a slot into which a compact disk can be inserted or, as in the above-mentioned application, a hatch into which it is possible to place a mobile telephone or a music player coupled to the car radio. Under such circumstances, the mounting orifices can be hidden behind the removable front plate.

The drawback of such removable front plates is their relatively large size, which means they are awkward to put into a pocket, for example.

OBJECT AND SUMMARY OF THE INVENTION

One of the objects of the invention is to propose a car radio and its mounting assembly that enables the various problems mentioned above to be solved, and in particular that:

eliminates dismounting orifices situated at the ends of the car radio housing;

makes it possible to incorporate a display of large dimensions, in particular one that extends edge-to-edge over three sides of the car radio, thereby presenting maximum useful area;

involves total absence of mounting orifices that are visible when the car radio is in place;

has no recourse to any additional piece or part such as a cover, thereby simplifying mounting, reducing cost, and maximizing the visibly available area; and makes it possible to avoid having recourse to a removable front plate of large dimensions.

To do this, the present invention proposes an assembly for incorporating in a slot in the dashboard of a motor vehicle, and comprising, as disclosed in above-mentioned U.S. Pat. No. 4,679,026 A:

an audio/video electronic appliance, in particular a car radio, the appliance comprising a housing a first set of electronic circuits and a front plate removably mounted on the housing, the front plate housing a second set of electronic circuits connected to a plurality of control members visible on the front plate;

a mounting sheath including means for securing it to the slot in the dashboard and suitable for receiving the housing of the electronic appliance, while leaving only the front face of the appliance visible and flush with the slot;

means for mechanically securing the housing in the sheath, comprising anti-return spring tongue means suitable for reversibly locking the housing in the sheath after the housing has been fully engaged therein; and means for unlocking the housing, said means comprising a tool suitable for being inserted in at least two orifices formed in the front face of the housing in order to come into contact with the anti-return spring tongue and to push it into a configuration for separating the housing from the sheath.

In a manner characteristic of the invention:

said two orifices in the front face of the housing are formed in a central zone of the housing that is central in the width direction, and in the vicinity of the top and bottom peripheral edges of the housing in the vertical direction;

said. two orifices are formed in a zone that is hidden by the front plate when it is mounted on the housing, and that is revealed when the front plate is separated from the housing;

said tool is a U-shaped extractor tool having two parallel flat branches suitable for being inserted in respective ones of said two orifices;

the width and the length of the front face of the housing are greater than the corresponding dimensions of the sheath so that the peripheral edge of the housing covers and hides the free edge of the sheath; and the assembly is essentially lacking in any peripheral piece of trim fitted to the interface between the housing and the free edge of the sheath.

According to various advantageous subsidiary characteristics:

the removable front plate is a half front plate, extending widthwise essentially over half of the front face of the housing, including the locations of said two orifices in said front face;

the portion of the front face of the housing that is not covered by the removable half front plate comprises a display, which display extends from one edge to the other of said front face of the housing that is not covered by the removable half front plate;

there are provided anti-return spring tongue, means suitable for reversibly locking the branches of the tool to the housing after the branches have been fully inserted in said two orifices of the housing; and the housing includes unlocking spring means suitable for placing said anti-return tongue in a configuration for separating the housing from the branches of the tool.

BRIEF DESCRIPTION OF THE DRAWINGS

There follows a description of an embodiment of the device of the invention given with reference to the accompanying drawings, in which the same numerical references are used from one figure to another to designate elements that are identical or functionally similar.

FIG. 1 is a perspective view of a car radio of the invention, assembled in the metal mounting sheath and as it appears in a utilization configuration.

FIG. 2 is an exploded perspective view of the car radio of the invention in a mounting configuration, with its metal sheath and its associated extractor tool.

FIG. 3 is an enlarged view of a detail marked III in FIG. 2.

FIG. 4 shows the FIG. 1 car radio coupled to the extractor tool in a configuration in which the car radio has just been extracted from its sheath.

FIG. 5 is a section view on a sagittal plane of the car radio, showing the metal sheath and the extractor tool.

FIG. 6 is an enlarged view of a detail identified by VI in FIG. 5.

MORE DETAILED DESCRIPTION

The car radio of the invention has external appearance in the form of an assembly of standardized dimensions suitable for incorporating in the dashboard of a motor vehicle.

The car radio proper comprises a housing 100 containing various electronic circuits, with a front plate 200 that, in the example shown, is a removable half front plate extending horizontally over a little more than half the length of the car radio.

FIG. 1 shows the car radio with the front plate 200 mounted on the housing, and thus in a functional position in which it can be used, while FIG. 2 shows the housing 100 with the half front plate 200 removed.

The removable half front plate 200 includes a rotary knob 202 and various control buttons 204, 206, 208, . . . . The removable half front plate 200 may thus combine all or nearly all of the car radio controls, together with various electronic circuits. This removable half front plate 200 is in the form of a flat rectangularly-shaped element with its front face carrying the various control members 202, 204, 206, 208, . . . and with its rear face carrying a connector (not shown) for coupling to the circuit in the housing 100.

The housing 100 comprises a body 102 containing the various electronic circuits of the car radio. The housing is designed to be incorporated in the dashboard of the vehicle, leaving only a flush front face 104 that faces towards the user. Horizontally, the front face 104 presents two halves 106 and 108, the half 106 receiving the removable half front plate 200 and the half 108 being a fixed front-plate portion, e.g. with a display screen 110 that extends vertically from one edge to the other of the front face 104 and horizontally as far as the far straight edge of said front face. The screen is advantageously a screen of large dimensions, e.g. a screen having a diagonal of 3.2 inches and thus occupying almost half of the width of the front face 104 for a housing 100 of the standardized "1 DIN" format, i.e. 180 mm×50 mm.

The left half 106 of the front face 104 acts as a socket 112 for receiving the removable half front plate 200, and as mentioned above it extends horizontally over a little more than half of the apparent extent of the front face 104.

The housing 100 is designed to be incorporated in the dashboard or in a console of a motor vehicle by means of a mounting sheath 300, e.g. a metal sheath, that is fastened to the inside of the slot in which the car radio is to be mounted.

By way of example, the sheath 300 is a metal element that is closed over four sides, presenting an opening 302 in its front face of dimensions that are suitable for receiving the housing 100 as a close fit. The sheath 300 also has resilient tabs 304 that serve, once the sheath has been inserted in the slot in the dashboard, to secure the sheath to the slot, the sheath being designed to remain in the dashboard.

In order to mount the car radio, the housing 100 is slid into the sheath 300 that has previously been fastened in the slot in the dashboard. Once it has been fully inserted, only the front face 104 of the unit appears on the outside, its slightly overhanging peripheral edge 114 serving to hide the gap between the housing, the sheath, and the dashboard.

The housing 100 is secured to the sheath 300 and thus to the vehicle dashboard by means of an anti-return spring tongue 116 that snaps into a matching opening 306 in the sheath 300.

In a manner characteristic of the invention, the anti-return spring tongue 116 is located approximately in the middle of the housing, in the horizontal direction, and it is provided with two of these tongues, one on the top portion and the other on the bottom portion of the housing. Reference may be made in particular to the section of FIG. 5 which is on a sagittal plane (a front-to-back vertical plane, perpendicular to the face view plane).

More precisely, and as shown in the detail views of FIGS. 3 and 6, the spring tongue 116 is retractable into an orifice 118 in the housing while it is being inserted, and it is folded on top to form two lugs 120 of dimensions and positions that correspond to the corresponding opening 306 in the sheath 300. The spring tongue 116 is of sufficient length (see FIG. 6) to enable it to be retracted into the opening 118 during insertion of the housing and then, by a ratchet effect, to return to its initial position when the opening 306 is reached, with the lugs 120 then locking the assembly in position.

When a user seeks to extract the housing 100 from the sheath 300, it is necessary to use a U-shaped tool 400 having two parallel flat branches 402 and 404 that are united by a central handle-forming element 406.

The two branches 402 and 404 are inserted in facing openings 122 and 124 that serve to provide access to the spring tongue 116 so as to push it downwards and thus disengage the lugs 120 from the orifice 306. This is the configuration shown in FIGS. 5 and 6.

In order to be able to exert traction on the housing 100 without being obliged to pull on the front face 104, the U-shaped extractor tool is advantageously provided in each of its branches 402 and 404 with respective openings 406 and 408 that serve to catch a lug 126 formed in the spring tongue 116 (see FIGS. 3 and 6). The user can then pull on the central element 406 that acts as a handle in order to extract the tool and housing assembled together as a unit as shown in FIG. 4.

In order to make it easier to detach the extractor tool 400 once the housing has been extracted, the spring tongue 116 advantageously includes a fin 128 on which it suffices to press a finger in order to bend the tongue and thus release the lug 126 from the corresponding opening 406 in the tool.

The above-described assembly provides multiple advantages.

Firstly, from an ergonomic point of view, the use of a half front plate enables the screen to be offset sideways and thus enables a large-dimension model to be used for the screen.

The positioning of the unlocking openings 122 and 124 in the middle portion of the housing enables the right and left side regions 130 (FIG. 1) to be completely free, whereas in a conventional device they are occupied by orifices for inserting disassembly keys. The front surface area of the car radio is thus used to the maximum and is not limited by any constraint associated with the dismounting and extraction mechanism.

Secondly, from an appearance point of view, the orifices for inserting the dismounting tool, situated in the central portion, are hidden by the half front plate 200 when it is mounted on the housing. It is thus possible to avoid any ugly element in the front plate, and also to avoid any additional part such as a cover or trim that would not only be of no use, but would also occupy potentially useful surface area of the front face of the car radio.

Finally, concerning the convenience of dismounting the car radio from the vehicle dashboard, it should be observed that using a single U-shaped extractor tool in its central portion enables the car radio to be extracted in a simple operation (the central position being balanced) and while using only one hand (because only one tool is used). This avoids the uncomfortable positions involved in using both hands with traditional devices, in particular when mounting in an awkward location, as a result of obstructions caused by the positions of seats relative to the dashboard, etc.

Extraction amounts to no more than the following operation:
removing the removable front plate so as to release access to the orifices 122, 124 into which the tool is inserted;
inserting the extractor tool 400;
extracting the tool and the housing as a unit assembly by pulling on the central portion 406 of the tool, which portion acts as a handle; and
separating the tool by pressing on the fins 128 with a finger.

What is claimed is:

1. An assembly for incorporating in a slot in the dashboard of a motor vehicle, the assembly comprising:
   an audio/video electronic appliance, in particular a car radio, the appliance comprising:
      a housing a first set of electronic circuits; and
      a front plate removably mounted on the housing, the front plate housing a second set of electronic circuits connected to a plurality of control members visible on the front plate;
   a mounting sheath including means for securing it to the slot in the dashboard and suitable for receiving the housing of the electronic appliance while leaving only the front face of the appliance, visible and flush with the slot;
   means for mechanically securing the housing in the sheath, comprising anti-return spring tongue means suitable for reversibly locking the housing in the sheath after the housing has been fully engaged therein; and
   means for unlocking the housing, said means comprising a tool suitable for being inserted in at least two orifices formed in the front face of the housing in order to come into contact with the anti-return spring tongue and to push it into a configuration for separating the housing from the sheath;
   wherein:
   said two orifices in the front face of the housing are formed in a central zone of the housing that is central in the width direction, and in the vicinity of the top and bottom peripheral edges of the housing in the vertical direction;
   said two orifices are formed in a zone that is hidden by the front plate when it is mounted on the housing, and that is revealed when the front plate is separated from the housing;
   said tool is a U-shaped extractor tool having two parallel flat branches suitable for being inserted in respective ones of said two orifices;
   the width and the length of the front face of the housing are greater than the corresponding dimensions of the sheath so that the peripheral edge of the housing covers and hides the free edge of the sheath; and
   the assembly is essentially lacking in any peripheral piece of trim fitted to the interface between the housing and the free edge of the sheath.

2. The assembly of claim 1, wherein the removable front plate is a half front plate, extending widthwise essentially over half of the front face of the housing, including the locations of said two orifices in said front face.

3. The assembly of claim 2, wherein the portion of the front face of the housing that is not covered by the removable half front plate comprises a display.

4. The assembly of claim 3, wherein the display extends from one edge to the other of said front face of the housing that is not covered by the removable half front plate.

5. The assembly of claim 1, including anti-return spring tongue means suitable for reversibly locking the branches of the tool to the housing after the branches have been fully inserted in said two orifices of the housing.

6. The assembly of claim 5, wherein the housing includes unlocking spring means suitable for placing said anti-return tongue in a configuration for separating the housing from the branches of the tool.

* * * * *